(12) United States Patent
Kjellberg

(10) Patent No.: US 6,520,565 B1
(45) Date of Patent: Feb. 18, 2003

(54) ARRANGEMENT WHICH MAKES IT POSSIBLE TO DISPLACE A CAB OF A VEHICLE

(75) Inventor: Sture Kjellberg, Bollebygd (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 09/806,001

(22) PCT Filed: Sep. 24, 1999

(86) PCT No.: PCT/SE99/01690
§ 371 (c)(1),
(2), (4) Date: Mar. 26, 2001

(87) PCT Pub. No.: WO00/18633
PCT Pub. Date: Apr. 6, 2000

(30) Foreign Application Priority Data

Sep. 30, 1998 (SE) .............................................. 9803318

(51) Int. Cl.⁷ .......................... B62D 23/00; B60R 21/02
(52) U.S. Cl. ............. 296/189; 296/190.01; 296/190.03; 296/190.05; 296/190.08; 296/35.2
(58) Field of Search .......................... 296/189, 190.01, 296/190.02, 190.03, 190.05, 190.08, 35.2

(56) References Cited

U.S. PATENT DOCUMENTS

| | | | |
|---|---|---|---|
| 4,378,856 A | | 4/1983 | Miller |
| 6,027,159 A | * | 2/2000 | Baumann .................... 296/189 |
| 6,312,038 B1 | * | 11/2001 | Kawamura et al. ......... 296/189 |
| 6,378,929 B2 | * | 4/2002 | Motozawa et al. ......... 296/189 |
| 6,394,535 B1 | * | 5/2002 | Kawamura et al. ......... 296/189 |
| 6,422,632 B1 | * | 7/2002 | Kamei et al. ................ 296/189 |
| 2001/0002761 A1 | * | 6/2001 | Tsuruta et al. .............. 296/189 |
| 2001/0026079 A1 | * | 10/2001 | Laurent et al. .............. 296/189 |
| 2001/0037908 A1 | * | 11/2001 | Motozawa et al. ......... 296/189 |

FOREIGN PATENT DOCUMENTS

| | | |
|---|---|---|
| DE | 1 680 095 | 10/1970 |
| DE | 26 12 517 | 10/1976 |
| DE | 28 53 621 | 6/1979 |
| DE | 197 33417 | 3/1998 |
| GB | 2 295 993 | 6/1996 |
| JP | 08230724 | 9/1996 |
| JP | 08268347 | 10/1996 |

* cited by examiner

Primary Examiner—D. Glenn Dayoan
Assistant Examiner—Hilary Gutman
(74) Attorney, Agent, or Firm—Young & Thompson

(57) ABSTRACT

The invention concerns an arrangement (8) for displacement of a driving-space (4) of a vehicle (1), comprising a first beam section (9) which on the one hand supports the driving-space (4), and on the other is arranged on a structural framework (2) on the vehicle (1), and a rear section (6) arranged behind the driving-space (4) which adjoins the driving-space (4) and which is connected to the structural framework (2), so that the rear section (6) is prevented from being displaced in the lengthwise direction of the vehicle (1). The first beam section (9) can be displaced relative to the structural framework (2), so that the driving-space (4) can be displaced in the direction of the rear section (6) under the conditions of a collision.

4 Claims, 3 Drawing Sheets

ARRANGEMENT WHICH MAKES IT POSSIBLE TO DISPLACE A CAB OF A VEHICLE

FIELD OF THE INVENTION

The present invention concerns an arrangement for the displacement of the driving-space of a vehicle, comprising a first beam section which on the one hand supports the cab and, on the other hand is arranged as a structural framework for the vehicle, and a rear section arranged behind the driving-space, which is joined to the driving space of the cab and which is connected to the structural framework, so that the rear section is prevented from being displaced in the lengthwise direction of the vehicle.

BACKGROUND OF THE INVENTION

When a lorry or bus has a head-on collision with, for example, another lorry there is a risk that the front part of the cab, together with the instrument panel, are pushed inwards in the direction towards the driver's seat due to the large forces which arise in the collision.

In the case of lorries which are equipped with an articulated cab, the cab's fixture at the first point between the cab and the vehicle framework is made to be separated in a head-on collision, so that the cab is displaced backwards, in order to reduce thereby the deformation of the cab. This fixture must exhibit good fatigue strength which results in the force from the cab which arises in a collision becoming large before the cab is separated from the first point. Due to the size of this collision force, the front part of the cab and the instrument panel are pushed inwards in the cab before the separation occurs. The hydraulic cylinder or cylinders which powers the articulation of the cab also contribute to the collision force, acting on the cab, becoming large before the separation occurs.

SUMMARY OF THE INVENTION

It is an objective of the present invention to achieve an arrangement which facilitates the displacement of the driving-space of a vehicle, which arrangement ensures that the driving-space remains essentially intact in the event of a collision.

This is achieved by means of an arrangement of the type given in the introduction, where the first beam section can be displaced relative to the supporting framework so that the driving-space is displaced in the direction towards the rear section under collision conditions.

Such an arrangement reduces the deformation of the cab when the vehicle collides with a vehicle in front or a barrier. Since the driving-space will remain essentially intact after the collision, the doors of the cab can still be opened, which makes it easier for the driver to get out of the cab.

BRIEF DESCRIPTION OF THE DRAWINGS

The invention is more precisely explained by means of the exemplary embodiments shown in the appended drawings, in which.

DETAILED DESCRIPTION OF THE INVENTION

Figure 1:
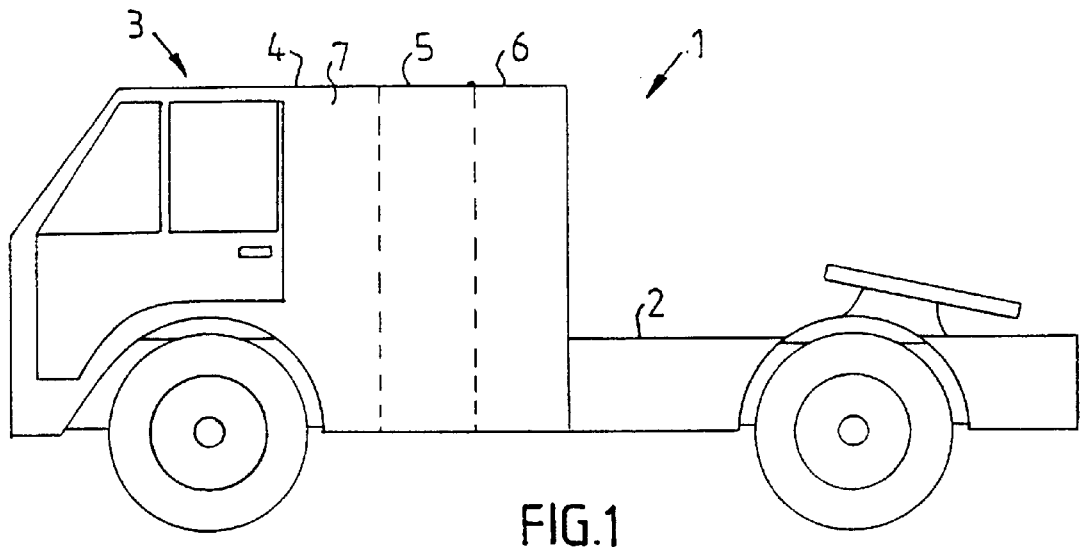
FIG. 1 shows a vehicle before a head-on collision.

FIG. 1 a vehicle 1 is shown in the form of a lorry which comprises a structural framework 2 on which a cab 3 is arranged. The cab 3 is divided into a driving-space 4, an energy-absorbing element and a rear section 6. The rear section 6 can, for example, consist of a sleeping berth or a storage space. The energy-absorbing element is arranged between the driving-space 4 and the rear section 6 and consists of the bodywork part 5 joined to both the driving-space 4 and the rear section 6, to form a deformation zone. The bodywork part 5 comprise of a plate extending between one side of the driving-space 4 and the rear section 6, including over the driving-space 4 and the upper side of the rear section to end at the other side of the driving-space 4 and the rear section 6. The plate can also extend along the floor between the driving-space 4 and the rear section 6. The plate is joined to the rear area of the driving-space 4 and the front area of the rear section 6. The driving-space 4 is arranged to be able to be displaced relative to the framework 2. The rear section 6 is connected to the framework 2 which is described more precisely below. The rear section 6 is thus not able to be displaced relative to the framework 2.

Figure 2:
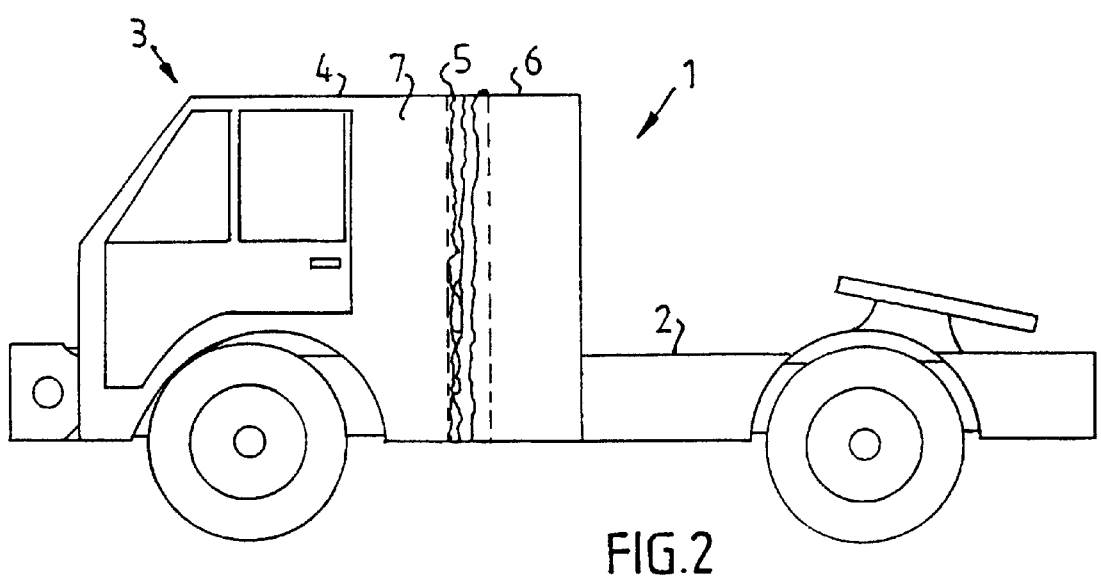
FIG. 2 shows a vehicle after a head-on collision

FIG. 2 shows the same vehicle after a head-on collision, when the driving-space 4 has been displaced backwards in the direction of the rear section 6. Since the rear section 6 is firmly fixed to beam section 10, the bodywork part has been compressed during the collision and therefore absorbed the energy which was produced during the course of the collision. The driving-space 4 is essentially intact after the collision. Therefore the bodywork part 5 must be so constructed that it gives way. This can be achieved for example by means of indications or notches/in the bodywork part 5.

Thus, by locating the bodywork part 5 behind the driving-space 4 the whole of the driving-space 4 is displaced backwards essentially intact, which, at the same time, results in the front part of the driving-space 4, the instrument panel and the driver's seat being displaced backwards without the distance between the instrument panel and the driver's seat being reduced. Consequently, the driver is not trapped between the seat and the instrument panel. During the collision the B-post 7 is also displaced backwards, which means that the seat-belt which holds the driver to the driving seat is also displaced backwards, since the seat-belt is arranged in B-post 7.

Instead of only the bodywork part 5 absorbing the shock, hydraulic dampers (not shown) can supplement the bodywork part 5 as energy-absorbing elements between the driving-space 4 and the rear section 6. The abovementioned indications in the bodywork part 5 can be constructed so that the course of the deformation can be controlled.

Figure 3:
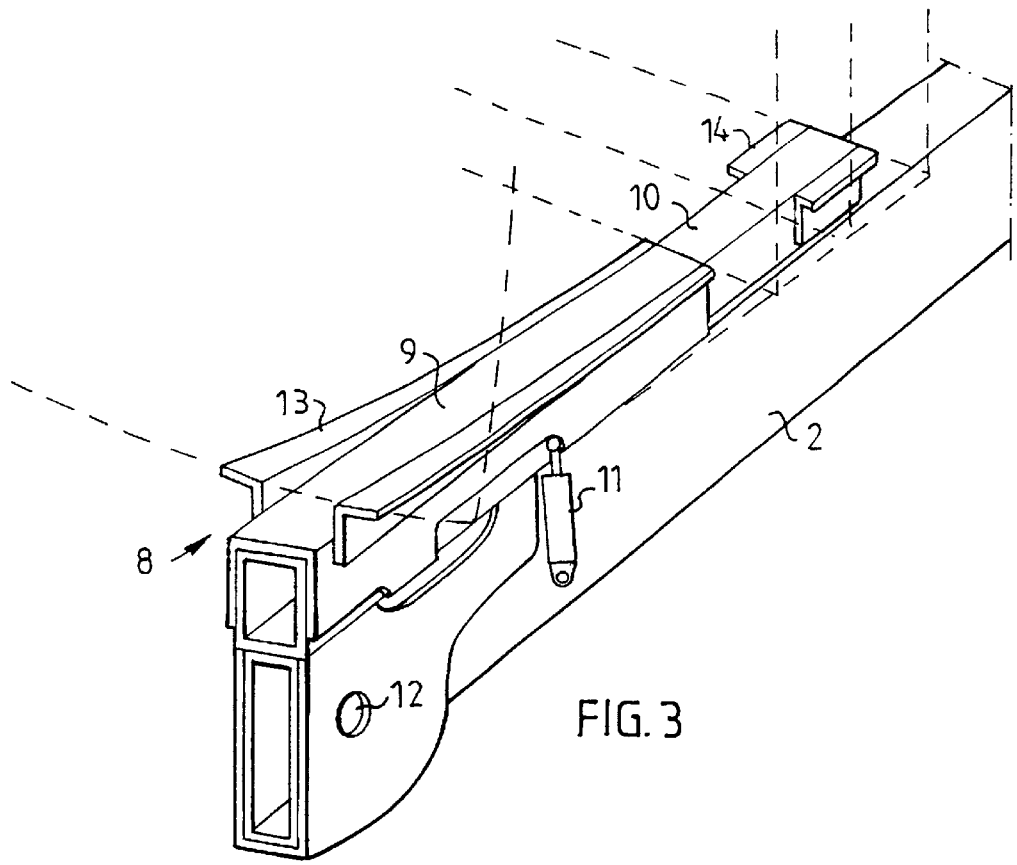
FIG. 3 shows an arrangement according to the first embodiment of the present invention before a collision.

An arrangement 8 which facilitates the displacement of the driving-space 4 is shown in FIG. 3. The arrangement 8 comprises a first beam section 9, which on the one hand supports the cab 3, and on the other hand is placed on the structural framework 2 via the second beam section 10, which is pivotably arranged on the framework 2, so that the cab 3 can be articulated relative to the framework 2. Articulation of the cab 3 is carried out by an articulation cylinder 11 so that the cab 3 and hence the first and second beam sections 9, 10 are pivoted at pivot point 12 arranged in the front part of the framework 2. The articulation cylinder 11 is arranged between the framework 2 and the second beam section 10. The first and second beam sections 9, 10 are provided with brackets 13, 14. The driving-space 4 is attached to bracket 13 and the rear section 6 is attached to bracket 14. In the figure, the cab 3 is indicated with doted lines. The first beam section 9 is arranged on the second beam section 10 so as to be able to be displaced. According to the exemplary embodiment shown, this is achieved by having the first beam section 9, at least partly, enclosing the second beam section 10, so that the first and second beam sections 9, 10 form a telescopic arrangement. FIG. 3 shows the arrangement 8 before a collision.

Figure 4:
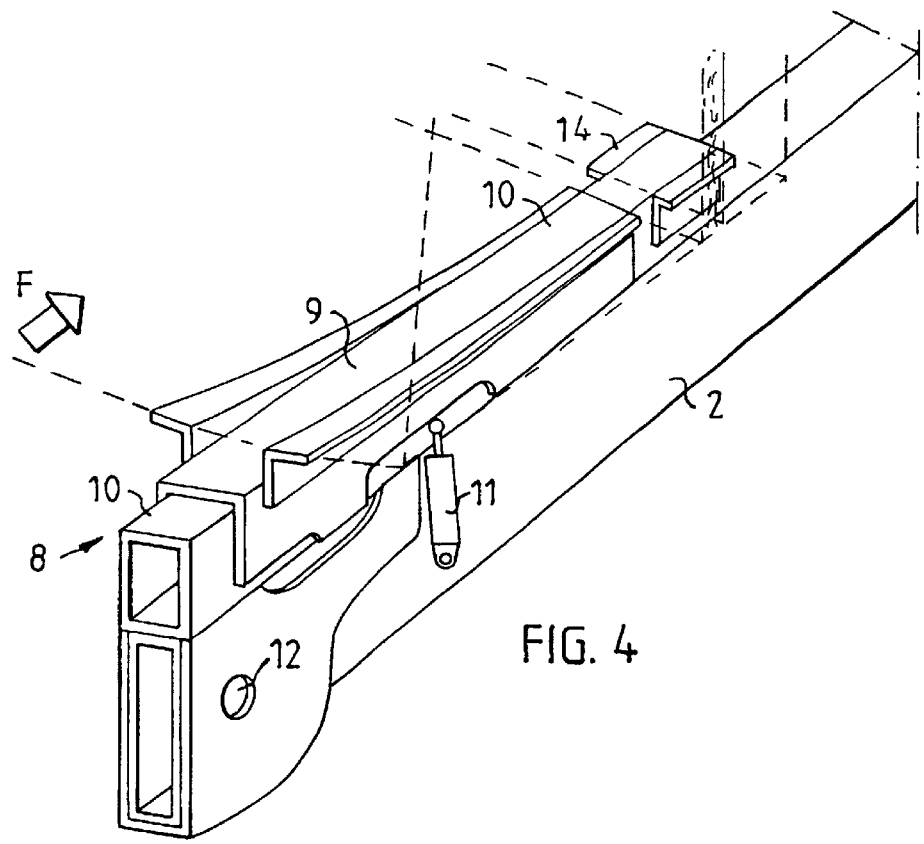
FIG. 4 shows an arrangement according to the first embodiment of the present invention after a collision.

FIG. 4 shows the arrangement 8 according to FIG. 3 after a head-on collision where the cab 3 has been subjected to a collision force F as indicated in the figure. The first beam section 9 has been displaced by the collision relative to the second beam section 10 and consequently also relative to the structural framework 2. As a result, the driving-space 4 has been displaced backwards in the direction of the rear section 6 so that the energy-absorbing element between the driving-space and the rear section 6 has been compressed. The energy-absorbing element has thus absorbed the energy which was produced during the collision, as described above.

In order to join the first and second beam sections 9,10 to each other and thereby prevent vibrations and rattling, the first and second beam sections 9,10 are glued securely to each other. The glue joint should then be dimensioned so that the first and second beam sections 9,10 come loose in the event of a collision.

Only half of the front part of the vehicle 1 is shown in FIGS. 3 and 4. Naturally, the beam sections 9,10 are placed on both sides under the cab 3 to obtain good stability.

Figure 5:
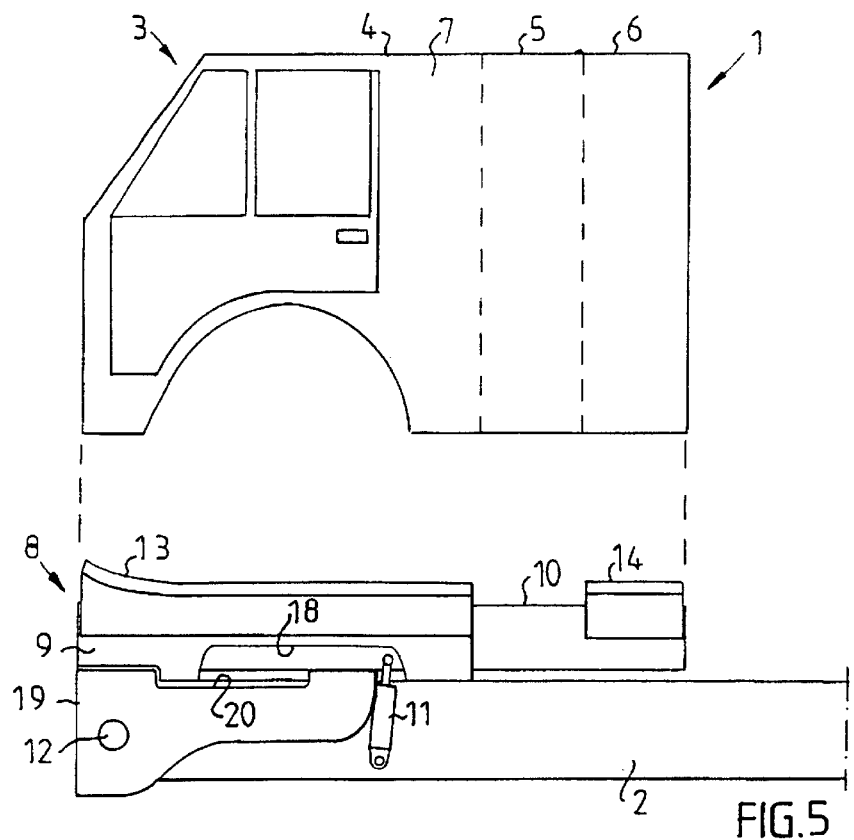
FIG. 5 shows a side view of an arrangement according to the first embodiment of the present invention before a collision.

A side view of the arrangement according to the first embodiment of the present invention is shown in FIG. 5. In the figure, the cab has been lifted away to show how the framework 2 and the beam sections 9,10 are arranged relative to each other.

The first beam section 9 has a recess 18 which allows the first beam section 9 to be displaced relative to a linkage piece 19 which is connected to the second beam section 10. The pivot point 12 extends through the linkage piece 19 and the framework 2, so that the beam sections 9,10 and hence the cab 3 can be articulated.

The linkage piece 19 is also fitted with a recess to allow the first beam section 9 to be displaced relative to the linkage piece 19.

The recess 18 in the first beam section 9 should have a length which allows the bodywork part 5 to be compressed in the event of a collision. For example the bodywork part 5 can be 300 mm long in the lengthwise direction of the vehicle 1. This implies that the recess 18 must be at least 300 mm long. To accommodate the connection of the linkage piece 19 and the fixture of the articulation cylinder 11 to the second beam section 10, the recess 18 must be sufficiently longer than the distance by which the bodywork part 5 is compressed in the event of a collision.

Figure 6:
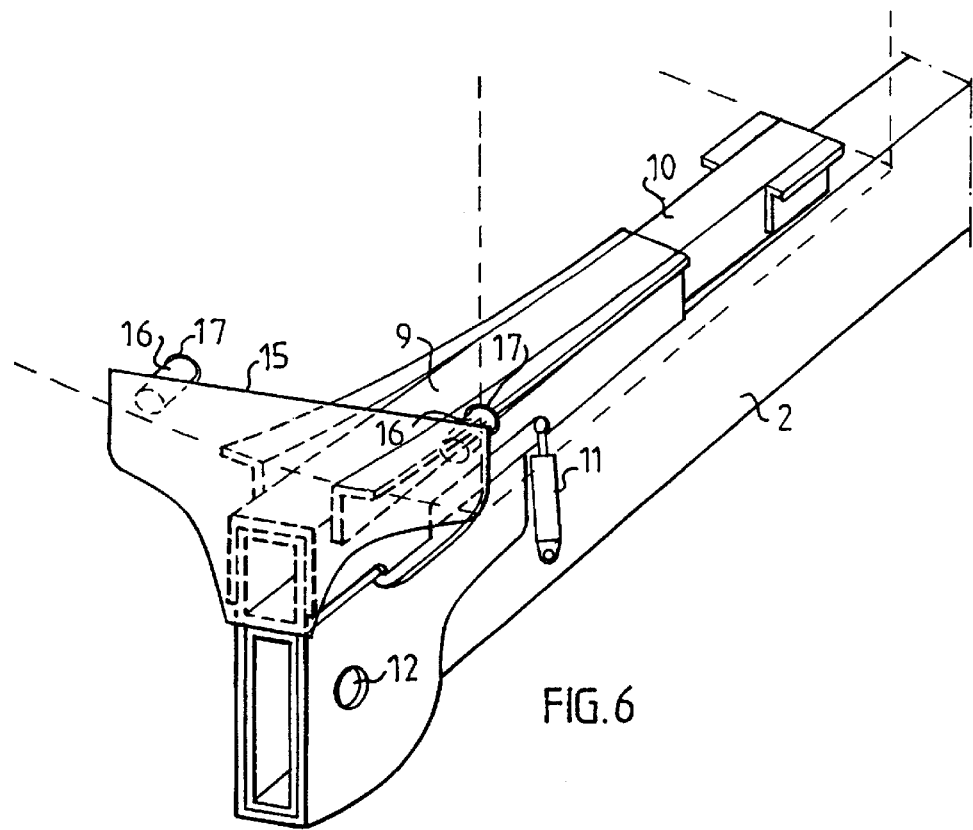
FIG. 6 shows an arrangement according to a second embodiment of the present invention before a no collision.

A second example of an embodiment of the arrangement 8 according to the invention is shown in FIG. 6. A mounting piece 15 is arranged on the front part of the second beam section 10, which mounting piece 15 comprises pegs 16 and/or holes 17 which engage with the cab 3, and which are separated from the cab 3 when the driving-space 4 is displaced in the direction of the rear section 6. The mounting piece 15 absorbs the lateral forces from the cab 3 during operation of the vehicle 1 which forces, for example, arise on cornering and thereby contributes to the vehicle 1 having a stiffer lateral structure. The pegs 16 are preferably introduced into the holes 17 with an interference fit which allows for separation in the event of a collision.

What is claimed is:

1. An arrangement to facilitate displacement of a driving-space of a vehicle relative to a rear section of the vehicle arranged behind the driving-space, said rear section being joined to the driving-space and connected to a structural framework of the vehicle such that the rear section is firmly fixed in the lengthwise direction of the vehicle, the arrangement comprising a first beam section which supports the driving-space and is displaceable relative to the structural framework such that the driving-space can be displaced in the direction of the rear section under the conditions of a collision, an energy-absorbing element being arranged between the driving-space and the rear section so as to form a deformation zone, wherein said energy-absorbing element comprises a bodywork part of the vehicle joining the driving-space and the rear section and further comprising a second beam section on which the first beam section is displaceably mounted, said second beam section being pivotably attached on the framework such that the driving-space and the rear section can be articulated relative to the framework.

2. The arrangement according to claim 1, wherein the driving-space, the structural framework and the energy-absorbing element form a cab of the vehicle.

3. The arrangement according to claim 1, wherein the first beam section at least partly encloses the second beam section such that the first and second beam sections form a telescopic arrangement.

4. The arrangement according to claim 3, further comprising:
   a cab including the driving space supported by said first beam section;
   a mounting piece arranged on a forward part of the second beam section,
   said mounting piece and said cab having interengaging pegs and holes for absorbing lateral forces in said mounting piece from the cab during operation of the vehicle, said pegs and holes being separable in the event of the collision.

* * * * *